Figure 2:
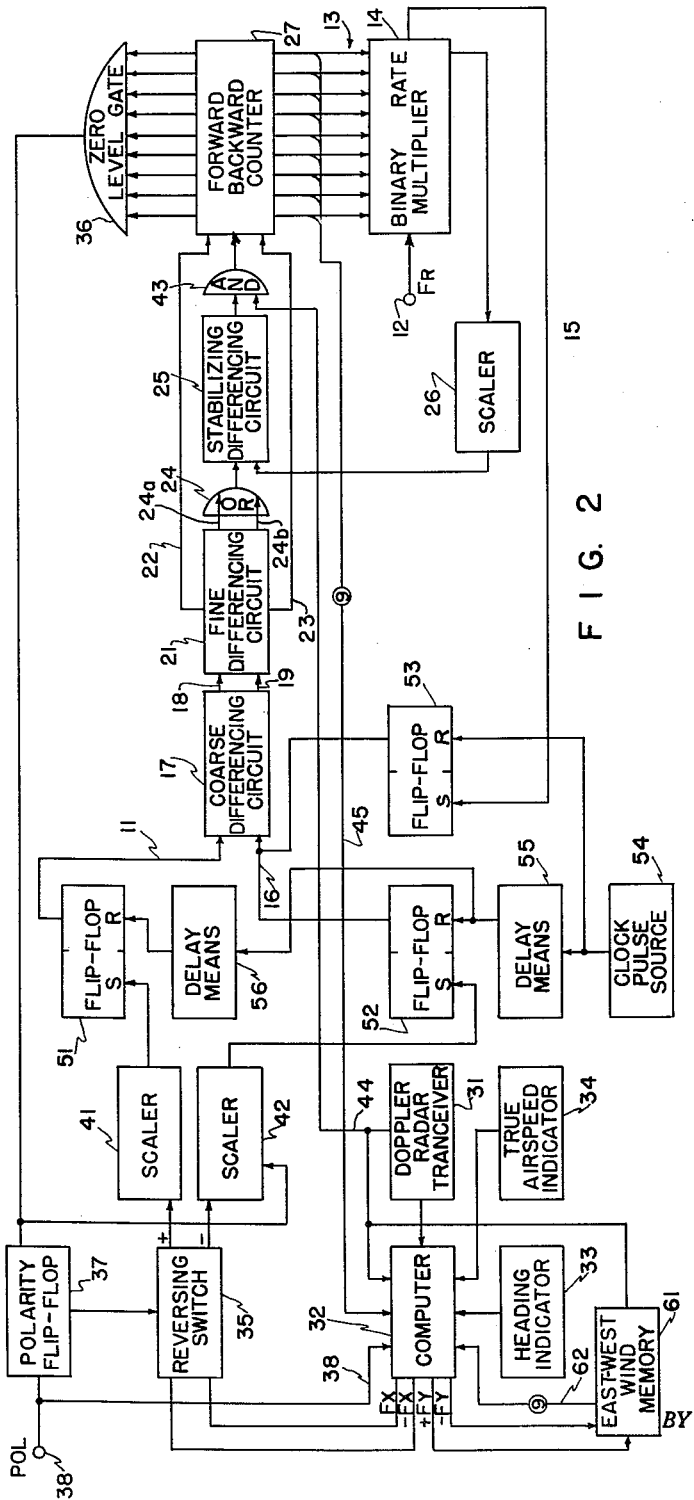

Feb. 13, 1962  E. D. OSTROFF  3,021,068
COMPUTING APPARATUS
Filed Jan. 8, 1959

$F_x = V_{GN} + V_{AS}$
$-F_x = V_{GS} + V_{AN}$

*INVENTOR.*
EDWARD D. OSTROFF

BY Fred Jacob
ATTORNEY

United States Patent Office 3,021,068
Patented Feb. 13, 1962

3,021,068
COMPUTING APPARATUS
Edward D. Ostroff, South Sudbury, Mass., assignor to Laboratory For Electronics, Inc., Boston, Mass., a corporation of Delaware
Filed Jan. 8, 1959, Ser. No. 785,725
7 Claims. (Cl. 235—164)

The present invention relates in general to navigational systems and more particularly concerns apparatus which continuously stores in digital form the most recent value of the wind velocity determined from signals supplied by an associated navigational computer operating upon velocity signals and presents the digital wind signal most recently stored to the computer when the velocity signals are temporarily interrupted. This enables the computer to continuously provide an accurate indication of the present position of the vehicle carrying the system.

A specific embodiment of the invention is especially suitable for use with a Doppler radar navigational system such as that disclosed in the copending applications of Maurice A. Meyer, entitled Doppler Radar System and Radar System, Serial No. 610,444 and Serial No. 610,443, now Patent No. 2,982,956, respectively, filed September 10, 1956. Basically, this type of system radiates a number of angularly spaced beams of high frequency energy toward the earth and senses the Doppler frequency shift in the energy returned from the earth. The returned energy is processed to provide three pulse trains having rates characteristic of the velocity components of the vehicle carrying the system along its three orthogonal axes with respect to the earth. A computer, employing operational digital techniques, responds to these pulse trains and signals characteristic of the roll, pitch and heading of the vehicle to provide a continuous indication of its present position.

The accuracy of the present position indicated by this system is exceptionally high. However, occasionally the returned signal may fade somewhat, causing the velocity indication derived from this signal to be unreliable for a short time. During such intervals it is desirable that the computer enter a dead reckoning mode of operation whereby it disregards the unreliable velocity indication and computes the present position in accordance with the air speed of the vehicle and the wind velocity determined at the time the velocity indication became unreliable.

The present invention contemplates and has as a primary object the provision of means for continuously storing a signal in digital form characteristic of present wind velocity so that an associated operational digital computer has immediate access to this signal when the velocity signals normally operated upon by the computer become unreliable.

Another object of the invention is to utilize pulse trains which may be provided by the normally operating computer for continuously and accurately determining the wind velocity.

Still another object of the invention is to prevent the stored wind signal from being changed when the velocity signals become unreliable.

A further object of the invention is to achieve the preceding objects with a minimum number of components arranged to provide an accurate indication of the wind velocity, yet is relatively insensitive to parameter variations.

According to the invention, the navigational system provides first and second signals, each having a frequency or rate characteristic of the carrying vehicle velocity with respect to a reference body such as the earth and the vehicle velocity with respect to a medium, such as air, in which the vehicle is traveling. Both of these velocities are components along a prescribed line of direction, such as the north-south line. The rate of the first signal is characteristic of the sum of the north and south velocities of the vehicle relative to the earth and air, respectively. The rate of the second signal is characteristic of the sum of the north and south velocities of the vehicle relative to air and earth, respectively. The first and second signals are combined to provide a third signal having a rate equal to the difference between the first and second signal rates and characteristic of the medium velocity along the prescribed line of direction with respect to the reference body; that is, the wind velocity along the north-south line.

The digital signal characteristic of the wind velocity along the north-south line is stored in a reversible counter and continuously applied to the rate control leads of a binary rate multiplier. The rate input of the binary rate multiplier is energized by a reference signal and its output provides said third signal having a rate corresponding to the reference signal rate multiplied by the digital number stored in the counter. The third signal is combined with that one of the first and second signals having the lower rate to form a fourth signal having a rate equal to the sum of said lower rate and the third signal rate.

The fourth signal rate is then combined with that one of said first and second signals having the higher rate to provide a count signal having a rate equal to the difference between the higher rate and the fourth signal rate for changing the count in the reversible counter until such difference is very nearly zero. The count is then representative of the wind velocity along the north-south line of direction.

Similar apparatus is utilized to determine the wind velocity along the east-west line of direction. The resultant wind velocity is then available by vectorially combining the orthogonal components along the north-south and east-west lines of direction.

Figure 1:
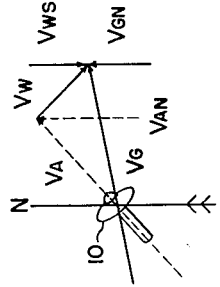

Other features, objects and advantages of the invention will become apparent from the following specification when read in connection with the accompanying drawing in which:

FIG. 1 diagrammatically represents an aircraft in flight together with vectors representative of ground speed, air speed and wind velocity; and FIG. 2 is a block diagram of a preferred embodiment of the invention for use with a Doppler radar system.

With reference now to the drawing and more particularly FIG. 1 thereof, an aircraft 10 is diagrammatically represented flying a generally northeast course with an air velocity represented by the vector $V_A$ while its actual ground velocity is indicated by the vector $V_G$. The vector difference, $V_A - V_G$, is the wind velocity represented by the vector $V_W$. All the velocities may be divided into orthogonal components pointing north, south, east and west. For the purpose of describing the principles of the invention, only components along the north-south line of direction will be considered since the system for components along the east-west line of direction is essentially the same.

The velocity components may be resolved into a north-pointing component, $V_{AN}$, of the air velocity and a north-pointing component, $V_{GN}$, of the ground velocity. The vector difference, $V_{WS}$, between these components is then the component of wind velocity along the north-south axis.

For reasons which facilitate instrumentation of this computation, a signal having a frequency $F_X$, proportional to the sum of north-pointing ground velocity and south-pointing air velocity and a signal having a rate designated $-F_X$ proportional to the sum of the south-pointing ground velocity and north-pointing air velocity is provided. The differential combination of these rates is proportional to the wind velocity along the north-south line of direction while their relative sense characterizes whether the wind velocity is north or south.

If the rate $F_X$ is greater than the rate $-F_X$, the component of wind velocity is north, the converse indicating a south component of wind velocity.

The specific means for obtaining these signals is not a part of the invention and accordingly is not shown and described in detail herein. However, the computing means for providing such signals preferably employs operational digital techniques instrumented generally as shown in a paper entitled Special-Purpose Digital Data-Processing Computers presented at the Pittsburgh meeting of the Association for Computing Machinery, at the Mellon Institute, May 2 and 3, 1952, by Bernard M. Gordon and Renato N. Nicola. This type of computing means is especially advantageous since computed quantities are directly provided in the form of pulse rates. Moreover, such computing apparatus may directly accept the wind signal in parallel binary form for operations when the indicated position is computed by dead reckoning.

Alternatively, the desired quantities might first be determined by an analog computer and presented in analog form. The signal in analog form might then be applied to a voltage controlled oscillator to provide signals whose frequencies are proportional to the applied analog signals. A digital-to-analog converter might be used to convert the digital wind signal into analog form for use in the analog computer.

The computer might also employ conventional digital techniques to provide the desired quantities in digital form. The digital signals could be directly applied to the rate control leads of a binary rate multiplier to provide the quantities in the desired form.

Referring now to FIG. 2, there is shown a block diagram of a Doppler radar system which utilizes dead reckoning computing techniques to determine the aircraft position when the Doppler signal return becomes temporarily unreliable as an indication of aircraft velocity. Many of the elements in this embodiment correspond to similar elements in the copending application of Edward D. Ostroff entitled Frequency Responsive Apparatus, Serial No. 785,449, filed January 7, 1959. Accordingly, it is convenient to identify such elements by the same reference numerals used in the copending application to facilitate reference to the latter application for details of such elements, portions of which are reproduced below.

Designating the digital number electrically represented on the rate control input leads 13 as $W_{NS}$ (corresponding to the magnitude of the wind velocity component along the north-south line of direction), the rate of the output signal provided on line 15 from binary rate multiplier 14 is $W_{NS}F_R$, $F_R$ being the rate of the fixed reference signal applied on terminal 12. This output signal, after appropriate synchronization and cumulative combination with a signal derived from that one of the signals having rates $\pm F_X$ having the lower rate, is applied to the input 16 of coarse differencing circuit 17. The other input to this circuit is a signal derived from that one of the latter signals having the higher rate delivered on line 11. The signals applied to lines 11 and 16 are synchronized to prevent pulse coincidence in a manner described in detail below. Assuming that $+F_X$ is higher than $-F_X$ and disregarding the scaling factor of four introduced by scalers 41 and 42 for purposes of this discussion, the signal on line 11 has a frequency $F_X$ and that applied to line 16 has a frequency $-F_X+W_{NS}F_R$, the quantities $-F_X$ and $W_{NS}F_R$ both being positive. If the rate $+F_X$ is higher than the rate $-F_X+W_{NS}F_R$, line 18 delivers a pulse train having a rate equal to the difference between these rates. If the relative magnitude of the rates is reversed, line 19 delivers a pulse train having a rate equal to the difference therebetween.

If that one of the signals applied to differencing circuit 17 actually having the lower rate with respect to a relatively long time interval develops a burst of pulses during a relatively short time interval between consecutive pulses of the signal actually having the higher rate, the incorrect one of lines 18 and 19 is energized. To eliminate the effects of this short term instability, the pulse trains on lines 18 and 19 are delivered to a fine differencing circuit 21 which provides an activating potential on one of forward and backward lines 22 and 23 when the rate $+F_X$ is respectively greater and less than the rate $-F_X+W_{NS}F_R$. The significance of these potentials will become apparent from the discussion below.

The signal of difference rate on the activated one of output lines 24a or 24b is coupled by buffer 24 to a stabilizing differencing circuit 25. This rate is equal to the difference between $+F_X$ and $-F_X+W_{NS}F_R$. The other input to the stabilizing differencing circuit 25 is energized by a pulse train having a rate equal to $$\frac{F_R}{2^{N+1}}$$

The signal having this rate is provided by a binary counter stage 26 energized by the output of the last counter stage in binary rate multiplier 14. N denotes the number of cascaded binary counter stages in rate multiplier 14 and the number of rate control input leads 13.

The stabilizing differencing circuit 25 provides an output pulse for altering the count $W_{NS}$ of the reversible forward-backward counter 27 only when the signal of difference rate provided by buffer 24 develops a rate greater than $$\frac{F_R}{2^{N+1}}$$

As a result, a difference rate corresponding to a value within plus or minus one-half of the least significant digit indicated by forward-backward counter 27 is allowed to exist in the feedback loop without altering the count stored therein. This type of operation prevents the least significant digit from hunting and moreover, ensures that the least significant digit indicated by counter 27 is the one most nearly representative of the computed magnitude of wind velocity along the north-south line of direction. The function of the activating potentials on forward and backward lines 22 and 23 now becomes apparent for such potentials function as directional control signals to control whether the count in counter 27 is retarded or advanced in order to maintain the count most nearly representative of this magnitude.

The actual number stored by counter 27 is the ratio of the difference between the rates $F_X$ and $-F_X$ to the rate $F_R$. Therefore, the actual value of the rate $F_R$ is a scale factor which may be selected in accordance with the maximum expected wind velocity.

The preceding discussion of the means for operating upon the signals $+F_X$ and $-F_X$ should facilitate understanding the operation of the system in its entirety. When the signal return with the Doppler frequency shift is reliable, the Doppler radar transceiver 31 provides signals to computer 32 which enables the computer to determine the aircraft ground velocity. The computer also receives signals characteristic of the aircraft heading and the aircraft air velocity from heading indicator 33 and true air speed indicator 34, respectively.

These indicators may be, for example, the available instruments presently used for these purposes on aircraft with suitable transducers for converting the indications into characteristic electrical signals. Whether the signals are provided in analog or digital form depends upon the nature of computer 32. For operational digital computing, it is preferred that these signals be provided in digital form and shaft to digital converters may be employed for this purpose in conformity with the techniques fully disclosed in the aforesaid paper presented by Gordon and Nicola.

The computer 32 combines the ground velocity signals, heading signal and air velocity signal to provide the signals having the rates $F_X$ and $-F_X$ which are applied to reversing switch 35. Reversing switch 35 responds to forward-backward counter 27 passing through zero by reversing the signals having rates $F_X$ and $-F_X$ applied to the plus and minus lines so that the higher of these two rates is always on the plus line.

When forward-backward counter 27 reaches zero, all the lines to zero level gate 36 are conditioned. Gate 36 is then enabled to provide an output signal for switching polarity flip-flop 37 which in turn activates reversing switch 35. Polarity flip-flop 37 also provides an indication on terminal 38 of which of the two rates is the higher; and, therefore, whether the component of wind velocity is north or south.

The scalers 41 and 42 scale down the input rates by a factor of four so that the signals applied to the inputs of the coarse differencing circuit 17 have rates well below the maximum operating frequency of the circuitry operating upon these signals to insure a very high degree of reliability. When forward-backward counter 27 is stabilized, the rate control lines 13 bear potentials characteristic of the binary number representative of the magnitude of the north-south component of wind velocity and the state of polarity flip-flop 37 indicates whether the component is north or south.

Count pulses for altering the count of forward-backward counter 27 from stabilizing difference circuit 25 must pass through a gate 43. This gate is normally enabled when Doppler radar transciever 31 is reliably tracking the Doppler frequency shift of returned energy by the conditioning potential delivered on line 44. This same conditioning potential is applied to computer 32 so that it functions normally to compute present position based on ground velocity. However, when reliable tracking is momentarily interrupted, a digital signal corresponding to the last determined binary representation of the wind velocity north-south component is available on the nine lines of cable 45 for use by computer 32. The sense of this number is indicated by the signal delivered to computer 32 over line 38. With line 44 deconditioned, computer 32 assumes a mode of operation whereby dead reckoning computations based on heading, air speed and the last computed wind velocity are utilized to determine the aircraft present position.

As a safety feature, the output of zero level gate 36 is also applied to scaler 42 as an inhibiting signal to this scaler, thereby preventing forward-backward counter 27 from counting backward whereby it would switch between all zeroes and all ones in response to a single count pulse.

The potential on line 44 for controlling the state of gate 43 and the mode of operation of computer 32 may be derived from trackers in the radar transceiver 31. Each of these trackers provides a single frequency output signal corresponding to the center frequency in the returned energy power spectrum of an associated beam. Normally the tracker follows only a narrow band of this spectrum. However, if tracking is temporarily interrupted due to the signal fading or a sudden shift in the position of the power spectrum, the tracker is automatically switched to wide band operation until it again locates the center of the power spectrum and is returned to normal narrow band operation. The position of the relay which controls this switching may be utilized for cntrolling the potential on line 44. For further details of such trackers, reference is made to the copending application of Maurice A. Meyer entitled Signal Processing Apparatus, Serial No. 615,733, filed October 10, 1956. Alternatively, the potential on this line might be controlled in accordance with received signal strength as indicated by the receiver AGC potential.

As indicated above, the signal pulses applied to lines 11 and 16 occur non-coincidentally. The apparatus effecting such non-coincidence and additively combining the output rate from scaler 42 with the output rate provided by binray rate multiplier 14 is shown in FIG. 2 between the scalers 41 and 42 and the coarse differencing circuit 17.

Flip-flops 51, 52 and 53 are respectively set by each output pulse from scaler 41, scaler 42 and the output of rate multiplier 14. Flip-flop 53 is reset by each clock pulse delivered by clock pulse source 54. Flip-flop 52 is reset by each clock pulse delayed by an interval furnished by delay means 55. Flip-flop 51 is reset by each clock pulse delayed by an additional interval furnished by delay means 56. When either of flip-flops 52 or 53 are reset, line 16 receives an input pulse. When flip-flop 51 is reset, line 11 receives an input pulse. The interval between clock pulses is less than the interval between consecutive pulses applied to the set inputs of the three flip-flops. The delay furnished by delay means 55 and 56 is preferably the same and equal to one-third of the time interval between clock pulses.

FIG. 2 also shows an east-west wind memory 61 which operates upon pulse trains having rates $F_Y$ and $-F_Y$, respectively analogous to the rates $F_X$ and $-F_X$. Its operation is controlled by the potential on line 44 in the manner described above and the digital signal characteristic of the magnitude of the east-west component of wind velocity is available to computer 32 on lines 62, the sense of this component being indicated by the signal on line 63. The circuit arrangement is the same as that shown and described above in connection with the north-south component.

There has been described novel computing means for operating upon the rates of data signals to provide a signal in parallel binary form characteristic of data derived from these rates. In particular, the apparatus is especially useful as a wind memory in association with a Doppler radar navigational system. Furthermore, means might be provided for visually displaying the wind velocity magnitude and direction to the pilot. This would enable the pilot to better guage landings since the wind information thus presented would be current at the time and location of landing, a wind shift being indicated almost instantaneously.

Those skilled in the art may now make numerous modifications and uses of and departures from the specific embodiments described herein without departing from the inventive concepts. Consequently, the invention is to be construed as limited only by the spirit and scope of the appended claims.

What is claimed is:

1. Computing apparatus comprising, first and second signal sources respectively supplying first and second variable rate signals, a source of a reference frequency signal, a binary rate multiplier having a rate input, rate control leads for receiving electrical signals in parallel binary form effective in causing the rate of a signal applied to said rate input to be altered by a factor related to the digital number thus represented in parallel binary form and provided as an output signal, means for applying said reference signal to said rate input, a reversible counter storing a count therein and providing a digital signal representative of said count in parallel binary form, means for coupling said digital signal to said rate control leads to control the rate of said rate multiplier output signal, means coupled to said first and second signal sources and responsive to the occurrence of a zero level in said reversible counter for switching said first and second signals into separate signal channels, means for combining said rate multiplier output signal with that one of said first and second signals having the lower rate to provide a third signal having a rate equal to the sum of the rate of said binary rate multiplier output signal and said lower rate, means for combining said third signal with that one of said first and second signals having the higher rate to provide a fourth signal having a rate equal to the difference between said third signal rate and said higher rate, and means for applying said fourth signal to said reversible counter to alter the count stored therein until the rate of said fourth signal is substantially zero.

2. In an aircraft navigation system, apparatus comprising, means providing first and second signals on separate lines, the first signal having a rate proportional to the sum of the component of aircraft ground speed in a predetermined direction and the component of aircraft air speed in the opposite direction, the second signal having a rate proportional to the sum of the component of aircraft air speed in the predetermined direction and the component of aircraft ground speed in the opposite direction, a reversible counter, means for converting the count in the counter to a rate signal, signal combining means having the count converted rate signal applied thereto, switching means coupling to the combining means that one of the first and second signals having the lower rate, differencing means having its first input energized by the higher rate one of the first and second signals, and its second input energized by the output of the combining means, and the differencing means being connected to the reversible counter to cause the counter to count in a direction causing the input signals to the differencing means to approach an equal rate.

3. Apparatus in accordance with claim 2, further comprising a zero level gate responsive to the count in the reversible counter becoming zero for providing a gate signal, and means responsive to the gate signal for causing the switching means to direct to the combining means that one of the first and second signals having the lower rate.

4. Apparatus in accordance with claim 2, further comprising, a zero level gate for providing a gate signal when the count in the counter becomes zero, a polarity flip-flop, means for applying the gate signal to the polarity flip-flop to cause the flip-flop to change its state, the state of the polarity flip-flop indicating which of the first and second signals has the higher rate, and the switching means being responsive to the state of the polarity flip-flop for directing the lower rate one of the first and second signals to the combining means and the higher rate one to the first input of the differencing means.

5. Apparatus in accordance with claim 2 in which the means for converting the count in the counter to a rate signal comprises a binary rate multiplier having its multiplier input energized by the output of the counter and its rate input energized by a reference signal source.

6. Apparatus in accordance with claim 2, further comprising, a gate interposed between the output of the differencing means and the reversible counter, and means responsive to a signal failure in the navigation system for inhibiting the gate to prevent an alteration of the count in the counter.

7. In an aircraft navigation system, apparatus comprising means simultaneously providing first and second signals on separate lines, the first signal having a rate proportional to the sum of the component of aircraft ground speed in a predetermined direction and the component of aircraft air speed in the opposite direction, the second signal having a rate proportional to the sum of the component of aircraft air speed in the predetermined direction and the component of aircraft ground speed in the opposite direction, differencing means responsive to the first and second signals for providing a third signal having a rate equal to the difference between the rates of the first and second signals, a reversible counter responsive to the third signal, and means for providing a signal indicative of which of the first or second signals has the higher rate.

References Cited in the file of this patent

UNITED STATES PATENTS

| | | |
|---|---|---|
| 2,679,636 | Hillyer | May 25, 1954 |
| 2,865,567 | Booth et al. | Dec. 23, 1958 |